(12) United States Patent  (10) Patent No.: US 6,192,675 B1
Hirota et al.                (45) Date of Patent:    Feb. 27, 2001

(54) EXHAUST GAS PURIFICATION DEVICE FOR AN INTERNAL COMBUSTION ENGINE

(75) Inventors: Shinya Hirota, Susono; Toshiaki Tanaka; Kouji Yoshizaki, both of Numazu; Nobumoto Ohashi; Eiji Iwasaki, both of Susono; Kazuhiro Itoh, Mishima, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/184,047

(22) Filed: Nov. 2, 1998

(30) Foreign Application Priority Data

Nov. 11, 1997 (JP) .................................... 9-308681
May 25, 1998 (JP) .................................... 10-142857

(51) Int. Cl.$^7$ ........................................ F01N 3/00
(52) U.S. Cl. ................... 60/286; 60/288; 60/292; 422/170
(58) Field of Search ............... 60/286, 287, 288, 60/292, 295; 422/170, 171, 172; 423/213.2

(56) References Cited

U.S. PATENT DOCUMENTS

| 3,273,971 | * | 9/1966 | Baddorf et al. | 60/286 |
| 3,791,143 | * | 2/1974 | Keith et al. | 60/286 |
| 4,175,107 | | 11/1979 | Iwaoka et al. | |
| 4,196,170 | * | 4/1980 | Cemenska | 422/171 |
| 4,820,492 | * | 4/1989 | Wada et al. | 422/171 |
| 5,121,601 | * | 6/1992 | Kammel | 60/286 |
| 5,412,945 | * | 5/1995 | Katoh et al. | 60/286 |
| 5,412,946 | * | 5/1995 | Oshima et al. | 60/286 |
| 5,839,273 | * | 11/1998 | Maus | 60/286 |
| 5,950,422 | * | 9/1999 | Dölling | 60/286 |
| 6,004,520 | * | 12/1999 | Hartweg et al. | 423/213.2 |

FOREIGN PATENT DOCUMENTS

| 0 381 236 A1 | 8/1990 | (EP) . |
| 0 779 096 A1 | 6/1997 | (EP) . |
| 2 313 796 | 12/1997 | (GB) . |
| 63-283727 | 11/1988 | (JP) . |
| 6-307230 | 11/1994 | (JP) . |
| 9-85041 | 3/1997 | (JP) . |

* cited by examiner

*Primary Examiner*—Thomas Denion
*Assistant Examiner*—Tu M. Nguyen
(74) *Attorney, Agent, or Firm*—Oliff & Berridge, PLC

(57) ABSTRACT

In an exhaust gas purification device, a catalytic converter containing selective reduction catalysts is disposed in an exhaust gas passage of an internal combustion engine capable of being operated at a lean air-fuel ratio. The catalytic converter includes a plurality of the selective reduction catalysts disposed in series in the casing of the catalytic converter. Bypass passages which supply the exhaust gas to downstream selective reduction catalysts in the casing by bypassing the upstream catalysts are provided. When a reducing agent is supplied to the exhaust gas upstream of the converter, a part of the supplied reducing agent directly reaches the downstream selective reduction catalyst through the bypass passages without being oxidized by the upstream selective reduction catalysts. Therefore, the $NO_x$ purifying abilities of the downstream catalysts are improved and the formation of sulfates on the downstream catalysts is suppressed.

17 Claims, 5 Drawing Sheets

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine which operates at a lean air-fuel ratio, for example, an engine such as a diesel engine or a lean-burn gasoline engine. More specifically, the present invention relates to an exhaust gas purification device provided with an $NO_x$ purifying catalyst capable of reducing $NO_x$ in an exhaust gas having a lean air-fuel ratio.

2. Description of the Related Art

An exhaust gas purification device utilizing an $NO_x$ purifying catalyst such as a selective reduction catalyst disposed in the exhaust gas passage of an internal combustion engine is known in the art. The selective reduction catalyst is a catalyst which is capable of reducing $NO_x$ in the exhaust gas even though the air-fuel ratio of the exhaust gas is lean, by selectively reacting $NO_x$ with substances such as HC (hydrocarbons) and CO (carbon monoxide) in the exhaust gas.

This type of exhaust gas purification device is disclosed in, for example, Japanese Unexamined Patent Publication (Kokai) No. 63-283727. The device in the '727 publication is provided with a selective reduction catalyst disposed in the exhaust gas passage of an internal combustion engine and reduces $NO_x$ in the exhaust gas, by the selective reduction catalyst, by reacting $NO_x$ with HC and CO contained in the exhaust gas of the engine.

When a selective reduction catalyst is used for purifying $NO_x$ in an exhaust gas, it is necessary to supply the substances which can react with and reduce $NO_x$, such as HC and CO. Usually, HC and CO are fed to the selective reduction catalyst by generating HC and CO in the combustion chamber of the engine, or by supplying a reducing agent to the exhaust gas in the exhaust gas upstream of the selective reduction catalyst (in this specification, a reducing agent means a substance which generates a reducing substances such as CO and $H_2$, or hydrocarbons HC in the exhaust gas). However, problems arise when the selective reduction catalyst is used for purifying $NO_x$ in a lean air-fuel ratio exhaust gas. It is known that the selective reduction catalyst usually also acts an oxidizing catalyst which oxidizes HC, CO in a lean air-fuel ratio exhaust gas. Therefore, when a reducing agent is supplied to the lean air-fuel ratio exhaust gas flowing into the selective reduction catalyst, almost all of HC and CO in the exhaust gas are oxidized at the portion of the catalyst near the inlet end face thereof and substantially no HC and CO reach the portion near the outlet end of the catalyst. Especially, when a platinum-zeolite catalyst is used as a selective reduction catalyst, substantially no HC, CO supplied to the catalyst reaches the latter half of the catalyst since the oxidizing ability of platinum (Pt) is large. In this case, since $NO_x$ is not reduced in the latter half of the catalyst due to the shortage of HC, CO, the $NO_x$ purification ability of the device as a whole becomes low.

Further, usually a small amount of $SO_2$ (sulfur dioxide) generated by the combustion of sulfur in fuel is contained in the exhaust gas of the engine. When $SO_2$ contacts an oxidizing catalyst in an oxidizing atmosphere, sulfate such as $SO_3$ (sulfur trioxide) is formed by the oxidation of $SO_2$. $SO_3$ further forms $H_2SO_4$ (sulfuric acid mist) by reacting with $H_2O$ in the catalyst or in the exhaust gas. Since sulfuric acid mist in the exhaust gas is detected as particulates, the amount of the particulate in the exhaust gas increases when an oxidizing catalyst is used.

Therefore, when a selective reduction catalyst which also acts as an oxidizing catalyst in a lean air-fuel ratio exhaust gas is used for purifying $NO_x$, a problem occurs in that the amount of the particulates in the exhaust gas increases due to the formation of sulfate (hereinafter, it should be understood that the term "sulfate" means both $SO_3$ and $H_2SO_4$).

It is also known that sulfate is reduced to $SO_2$ on the selective reduction catalyst by reacting with reducing agent. Therefore, if more than two selective reduction catalysts are arranged in the exhaust gas passage of the engine in series, sulfate formed by the upstream catalyst may be reduced to $SO_2$ by the downstream catalyst. However, also in this case, since the reducing agent supplied to the exhaust gas upstream of the upstream catalyst is oxidized by the upstream catalyst, substantially no reducing agent reaches the downstream catalyst. Therefore, sulfates in the exhaust gas are not reduced on the downstream selective reduction catalyst. Thus, on the downstream catalyst, an increase in the amount of particulates and an insufficient reduction of $NO_x$ in the exhaust gas occur.

The problems set forth above may be solved if a plurality of selective reduction catalysts are arranged in the exhaust gas passage in series, and if the reducing agent is supplied to the exhaust gas at the inlets of the respective catalysts. However, in this case, the device for supplying the reducing agent is required for each of the catalysts and the problems of a complication of the system and an increase in the manufacturing cost arise.

SUMMARY OF THE INVENTION

In view of the problems in the related art as set forth above, the object of the present invention is to provide an exhaust gas purification device which is capable of suppressing the increase in the particulates due to oxidation of the sulfate without increasing the complexity and the cost of the device while maintaining the $NO_x$ purification ability of the device as a whole at a high level.

The objects as set forth above are achieved by an exhaust gas purification device for an internal combustion engine, according to the present invention, comprising a plurality of selective reduction catalysts disposed in series in the exhaust gas passage of the engine, wherein each of the selective reduction catalysts is capable of reducing $NO_x$ in the exhaust gas of the engine by selectively reacting $NO_x$ with a reducing agent in the exhaust gas even if the air-fuel ratio of the exhaust gas is lean, reducing agent supply means for supplying the reducing agent to the exhaust gas in the exhaust gas passage upstream of a first selective reduction catalyst disposed at the most upstream side in the selective reduction catalysts and bypass passage means for bypassing at least the first catalyst in such a manner that a part of the exhaust gas containing the reducing agent directly flows into selective reduction catalysts downstream of the first catalyst without flowing through the first catalyst.

According to this aspect of the invention, a part of exhaust gas containing the reducing agent is directly flows into the downstream selective reduction catalyst without passing through the first catalyst. Therefore, a sufficient amount of the reducing agent reaches the selective reduction catalysts downstream of the first catalyst without supplying the reducing agent directly from the reducing agent supply means to the inlets of the respective selective reduction catalysts. Thus, according to the present invention, the increase in the particulates can be prevented and the $NO_x$ purifying capability is improved without increasing the complexity and manufacturing cost of the device.

According to another aspect of the present invention, there is provided an exhaust gas purification device for an internal combustion engine equipped with a turbocharger, and capable of operating at a lean operating air-fuel ratio, comprising, a plurality of $NO_x$ occluding and reducing catalysts disposed in series in the exhaust gas passage of the engine downstream of the turbocharger, wherein each of the $NO_x$ occluding and reducing catalyst absorbs $NO_x$ in the exhaust gas when the air-fuel ratio of the exhaust gas is lean and releases and reduces the absorbed $NO_x$ when the air-fuel ratio of the exhaust gas is rich, reducing agent supply means for supplying a reducing agent to the exhaust gas upstream of the turbocharger in order to make the air-fuel ratio of the exhaust gas rich when the engine is operated at a lean operating air-fuel ratio and a bypass passage which bypasses, at least, a first $NO_x$ occluding and reducing catalyst disposed at the most upstream in the $NO_x$ occluding and reducing catalysts by connecting a waste gate passage of the turbocharger to at least one of the $NO_x$ occluding and reducing catalysts disposed downstream of the first $NO_{x[ooOc]}$ occluding and reducing catalyst.

According to this aspect of the invention, a plurality of $NO_x$ occluding and reducing catalysts, which are capable of absorbing $NO_x$ when the air-fuel ratio of the exhaust gas is lean and releases and reduces the absorbed $NO_x$ when the air-fuel ratio of the exhaust gas becomes rich by the reducing agent supplied to the exhaust gas, are arranged in the exhaust gas passage in series. In this case, the reducing agent is oxidized by the first catalyst and substantially no reducing agent reaches the $NO_x$ occluding and reducing catalysts downstream of the first $NO_x$ occluding and reducing catalyst if the reducing agent is supplied only to the exhaust gas upstream of the first $NO_x$ occluding and reducing catalyst. Further, since the $NO_x$ purifying capability of $NO_x$ occluding and reducing catalysts changes in accordance with the temperature, the $NO_x$ purifying capability of the first $NO_x$ occluding and reducing catalyst may become low when the exhaust gas temperature becomes high during a high load operation of the engine. In this aspect of the invention, in a partial load operation of the engine, i.e., the operation where the waste gate valve of the turbocharger is closed, all the exhaust gas is supplied to the first $NO_x$ occluding and reducing catalyst and the $NO_x$ in the exhaust gas is purified by the first $NO_x$ occluding and reducing catalyst. When the engine load becomes high, the waste gate valve of the turbocharger opens and a part of the exhaust gas is supplied to the $NO_x$ occluding and reducing catalyst downstream of the first $NO_x$ occluding and reducing catalyst directly through the waste gate passage without passing through the first $NO_x$ occluding and reducing catalyst. In this condition, the $NO_x$ absorbing capability of the first $NO_x$ occluding and reducing catalyst becomes lower due to a temperature rise in the high load operation of the engine. However, the temperatures of the downstream $NO_x$ occluding and reducing catalysts are relatively low even in the high load operation of the engine. Therefore, by supplying the exhaust gas directly to the downstream $NO_x$ occluding and reducing catalysts from the waste gate passage, $NO_x$ in the exhaust gas is absorbed by the downstream $NO_x$ occluding and reducing catalyst which still maintains a relatively high $NO_x$ absorbing capability. Further, when the reducing agent is supplied to the exhaust gas upstream of the turbocharger, the reducing agent is also supplied to the downstream $NO_x$ occluding and reducing catalysts from the waste gate passage. Therefore, the released $NO_x$ is reduced on the downstream $NO_x$ occluding and reducing catalysts by reacting with the reducing agent.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of the exhaust gas purification device according to the present invention will be explained with reference to FIGS. 1 through 10.

Figure 1:
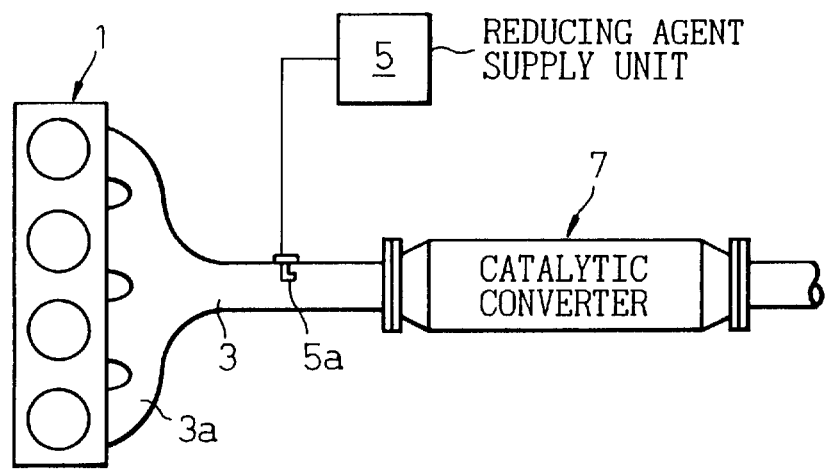
FIG. 1 is the general configuration of an embodiment of the exhaust gas purification device according to the present invention when it is applied to an automobile diesel engine.

FIG. 1 is a drawing schematically illustrating an embodiment of the exhaust gas purification device when the present invention is applied to an automobile diesel engine. In FIG. 1, reference numeral 1 designates an automobile diesel engine, numeral 3 designates an exhaust gas passage connected to the exhaust ports of the respective cylinders of the engine via an exhaust manifold 3a. In FIG. 1 numeral 7 designates a catalytic converter containing selective reduction catalysts. The selective reduction catalyst will be explained later.

In this embodiment, a reducing agent supply unit 5 is provided for injecting a reducing agent into the exhaust gas in the exhaust gas passage 3 upstream of the catalytic converter 7. The reducing agent is injected into the exhaust gas from the nozzle 5a of the reducing agent supply unit 5 disposed on the exhaust gas passage 3 upstream of the converter 7.

Any substance which generates hydrocarbons or reducing substances such as $H_2$ and CO may be used as the reducing agent supplied from the reducing agent supply unit 5 in this embodiment. For example, reducing gases such as hydrogen, carbon monoxide, gaseous and liquid hydrocarbons such as propane, propylene and butane, liquid fuel such as gasoline, diesel fuel, kerosene may be used for the reducing agent in this embodiment. However, a diesel fuel the same as the fuel of the engine 1 is used as the reducing agent for the convenience in the supply and the storage thereof.

Though the reducing agent is supplied by the reducing agent supply unit 5 in this embodiment, the reducing agent may be supplied to the catalytic converter 7 by other means. For example, when a gasoline engine is used, HC and CO in the exhaust gas discharged from the engine can be increased by, for example, delaying the ignition timing or lowering the operating air-fuel ratio of the engine. Therefore, when a gasoline engine is used, the engine may be operated at a delayed ignition timing and/or low operating air-fuel ratio periodically in order to increase HC and CO in the exhaust gas. In this case, the HC and CO in the exhaust gas is supplied to the selective reduction catalyst in the catalytic converter 7 and adsorbed in the selective reduction catalyst. When the gasoline engine resumes its normal operation (i.e., a lean air-fuel ratio operation), $NO_x$ in the exhaust gas is reduced on the selective reduction catalyst using the HC and CO adsorbed in the catalyst.

Figure 2:
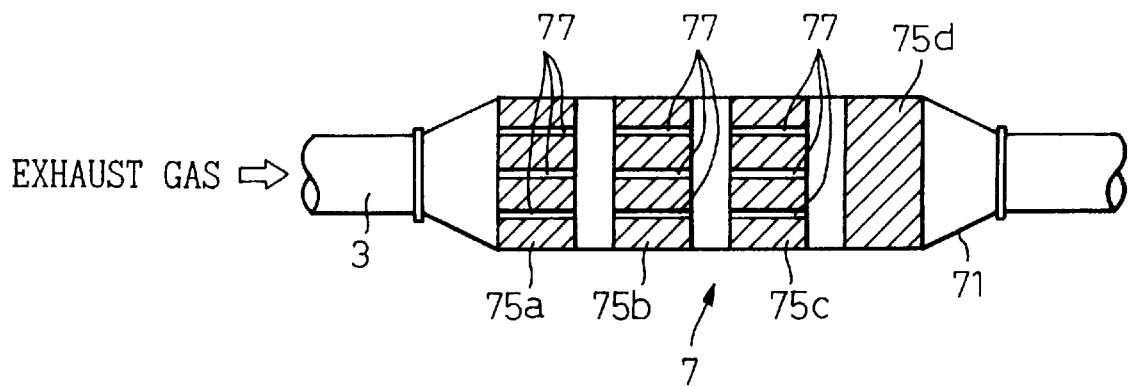
FIG. 2 is a longitudinal section view illustrating an example of the construction of the catalytic converter in FIG. 1.

FIG. 2 is a longitudinal section view of an embodiment of the catalytic converter 7 in FIG. 1. As can be seen from FIG. 2, the catalytic converter 7 consists of a casing 71 and a plurality of selective reduction catalysts 75a, 75b, 75c and 75d arranged in the casing 71. The catalysts 75a through 75d are disposed in series in the direction of the exhaust gas flow with spaces between the catalysts.

The selective reduction catalyst in this embodiment has a porous substrate made of, for example, zeolite ZSM-5 or alumina $Al_2O_3$, and catalytic components of precious metals such as platinum Pt, silver Ag, palladium Pd, rhodium Rh, iridium Ir, or catalytic components of base metals such as copper Cu, iron Fe, cobalt Co, nickel Ni are attached to the porous substrate by an ion exchange or an impregnating method. When an appropriate amount of HC or CO exists, the selective reduction catalyst selectively causes $NO_x$ in the exhaust gas to react with HC and CO and reduces $NO_x$ into $N_2$ even if the air-fuel ratio of the exhaust gas is lean. Namely, the selective reduction catalyst traps HC and CO in the exhaust gas in the pores of the porous substrate such as zeolite, further, when the air-fuel ratio of the exhaust gas is lean, $NO_x$ in the exhaust gas is attached to the surface of the metal catalytic components. HC or CO trapped in the porous substrates are released therefrom when the temperature of the substrate is within a certain range and selectively reacts with the $NO_x$ attached to the surface of the catalytic components in a lean air-fuel ratio atmosphere and reduces $NO_x$ to $N_2$ by, for example, the following reaction.

$uHC+vNO_2 \rightarrow wH_2O+yCO_2+zN_2$ (u, v, w, y, z are constants)

However, since the precious metal or the base metal used as the catalytic components of the selective reduction catalyst also act as oxidizing catalysts, HC and CO in the exhaust gas are oxidized by the selective reduction catalyst when the air-fuel ratio of the exhaust gas is lean. Therefore, when a lean air-fuel ratio exhaust gas containing HC and CO flows through the selective reduction catalyst, almost all of HC and CO in the exhaust gas is oxidized near the front end of the selective reduction catalyst and substantially no HC and CO reaches the latter half of the selective reduction catalyst. Thus, usually the reduction of $NO_x$ in the exhaust gas does not occur in the latter half of the selective reduction catalyst. This causes the $NO_x$ purifying capability of the selective reduction catalyst to become lower. Especially, when a precious metal having a large oxidizing ability, such as platinum Pt is used as the catalytic component, the deterioration of the $NO_x$ purifying capability of the selective reduction catalyst becomes large.

Further, when $SO_2$ (sulfur dioxide) is contained in the exhaust gas having a lean air-fuel ratio, $SO_2$ is oxidized on the selective reduction catalyst and forms $SO_3$ (sulfur trioxide) in the exhaust gas. A part of the formed $SO_3$ further reacts with $H_2O$ in the exhaust gas and forms $H_2SO_4$, and the remaining part of $SO_3$ reacts with a metal catalytic component and forms metal sulfates. A part of $H_2SO_4$ and metal sulfates formed by the reaction is trapped in the pore of the substrate and, when the temperature of the substrate becomes high or when the oxygen concentration in the exhaust gas becomes low, the metal sulfates and $H_2SO_4$ are released from the substrate and diffuse into the exhaust gas.

When the reducing agent exists in the exhaust gas, the $SO_3$ formed by the oxidation of $SO_2$ is again reduced to $SO_2$ by the reducing agent. Therefore, it is effective to supply a reducing agent to the selective reduction catalyst in order to prevent the formation of $H_2SO_4$ and the metal sulfate. However, if a plurality of selective reduction catalysts are arranged in the exhaust gas passage in series, almost all of the reducing agent in the exhaust gas is oxidized on the upstream selective reduction catalyst and does not reach the downstream selective reduction catalyst. In this case, though the sulfate formed on the upstream selective reduction catalyst is immediately reduced to $SO_2$ by the reducing agent on the first selective reduction catalyst, since substantially no reducing agent exists on the downstream selective reduction catalyst, the $SO_2$ formed on the upstream selective reduction catalyst is again oxidized on the downstream selective reduction catalyst. Thus, sulfate is formed on the downstream selective reduction catalyst even though the reducing agent is supplied to the exhaust gas.

According to the present embodiment, bypass passages are provided in order to supply the exhaust gas containing the reducing agent directly to the downstream selective reduction catalysts. Namely, a part of the exhaust gas flows through the bypass passages and flows into the downstream selective reduction catalyst without passing through the upstream selective reduction catalyst. Thus, in this embodiment, since a sufficient amount of the reducing agent is supplied to the downstream selective reduction catalysts, the $NO_x$ purifying ability of the catalytic converter as a whole is improved and the formation of the sulfate is suppressed.

In the selective reduction catalysts 75a through 75c, a plurality of bypass passages 77 are formed within the substrate of each of the catalysts 75a through 75c. In this embodiment, these passages are formed by cells (or capillaries) of the substrates which do not carry catalytic components on the cell walls.

Usually, a number of cells or capillaries are formed within the substrate of the catalyst. These cells or capillaries act as the passages through which the exhaust gas flows. Usually, catalytic components are carried on (i.e., attached to) the walls of each cells or capillaries and exhaust gas contacts the catalytic components carried on the wall of the cells or capillaries when the exhaust gas flows through the cells or capillaries. However, in this embodiment, the walls of a predetermined number of cells (capillaries) are masked before the catalytic components are attached to the substrate so that catalytic components are not attached to these walls. Therefore, cells (capillaries) having walls which carry no catalytic components are formed within the substrate of the selective reduction catalyst. When exhaust gas flows through these cells carrying no catalytic components, the exhaust gas passes through the substrate without contacting the catalytic components. Therefore, the reducing agent in the exhaust gas passes through these cells without being oxidized by the catalytic components. Namely, these cells or capillaries having the walls carrying no catalytic components act as bypass passages which pass the catalyst in such a manner that a part of the exhaust gas containing the reducing agent directly flows into the downstream catalysts without contacting the catalytic components. The amount of exhaust gas passing through the bypass passages, i.e., the amount of the reducing agent supplied to the downstream selective reduction catalysts is determined by the number of cells or capillaries which have walls carrying no catalytic components.

Instead of forming the bypass passages by a plurality of cells or capillaries having the walls carrying no catalytic components, the bypass passages may be formed by cutting off a part of substrate after attaching the catalytic components on the walls of all cells or capillaries. For example, the bypass passage may be formed by holes drilled through the substrate from the upstream end to the downstream end thereof. In this case, the cut off portion of the substrate acts as the bypass passage.

In the catalytic converter 7 in FIG. 2, the bypass passages are formed within the substrates of the respective selective reduction catalyst 75a through 75c. Therefore, though a part of the exhaust gas flowing into the catalytic converter 7 flows through the selective reduction catalyst 75a disposed at the most upstream, the remaining part of the exhaust gas passes through the bypass passages 77 of the selective reduction catalyst 75a and directly reaches the second selective reduction catalyst 75b downstream of the selective reduction catalyst 75a. A part of the reducing agent in the exhaust gas flows through the selective reduction catalyst 75a is used for the reduction of $NO_x$ in the exhaust gas and the reduction of the sulfate on the selective reduction catalyst 75a and the remaining part of the reducing agent is oxidized on the selective reduction catalyst 75a. Therefore, the exhaust gas flowing out from the selective reduction catalyst 75a contains only a small amount of HC and CO. However, the exhaust gas passing through the bypass passages 77 of the selective reduction catalyst 75a does not contact the catalytic components and contains a relatively large amount of HC and CO. Therefore, a relatively large amount of HC and CO are supplied to the second selective reduction catalyst 75b by the exhaust gas passing through the bypass passages 77 of the selective reduction catalyst 75a. Thus, the reduction of $NO_x$ and sulfate is also performed on the second selective reduction catalyst 75b. Further, since the bypass passages are also formed within the substrates of the second and the third selective reduction catalysts 75b and 75c, a sufficient amount of HC and CO reach the third and the fourth selective reduction catalyst 75c and 75d and the reduction of $NO_x$ and sulfate is performed also on the third and the fourth selective reduction catalyst 75c and 75d. Thus, in the catalytic converter 7 in FIG. 2, since the respective selective reduction catalysts 75a through 75d perform the reduction of $NO_x$ and sulfate, the $NO_x$ purifying capability of the catalytic converter 7 as a whole is largely improved while suppressing the formation of sulfate.

In the embodiment in FIG. 2, if the bypass passages are formed by cutting off a part of substrate, the flow resistance of the bypass passages becomes low compared to the resistance of the substrate. This causes the flow velocity of the exhaust gas flowing through the substrate to become lower compared to the case where no bypass passages are provided. Generally, the $NO_x$ purifying ability of the selective reduction catalysts becomes larger as the space velocity of the exhaust gas becomes lower. Therefore, the $NO_x$ purifying abilities of the selective reduction catalysts 75a through 75c are also improved compared with the case where no bypass passages are provided.

In this embodiment, the most downstream selective reduction catalyst 75d is not provided with the bypass passages. Since all of the upstream selective reduction catalysts 75a through 75c are provided with the bypass passages, a relatively large amount of HC and CO reach the most downstream selective reduction catalyst 75d in this embodiment. However, since no bypass passages are provided on the selective reduction catalyst 75d, all the reducing agent in the exhaust gas flows through the selective reduction catalyst 75d and is oxidized by the catalyst 75d and no HC and CO pass through the selective reduction catalyst 75d. Thus, the exhaust gas flowing out from catalytic converter 7 does not contain any HC and CO.

Figure 3:
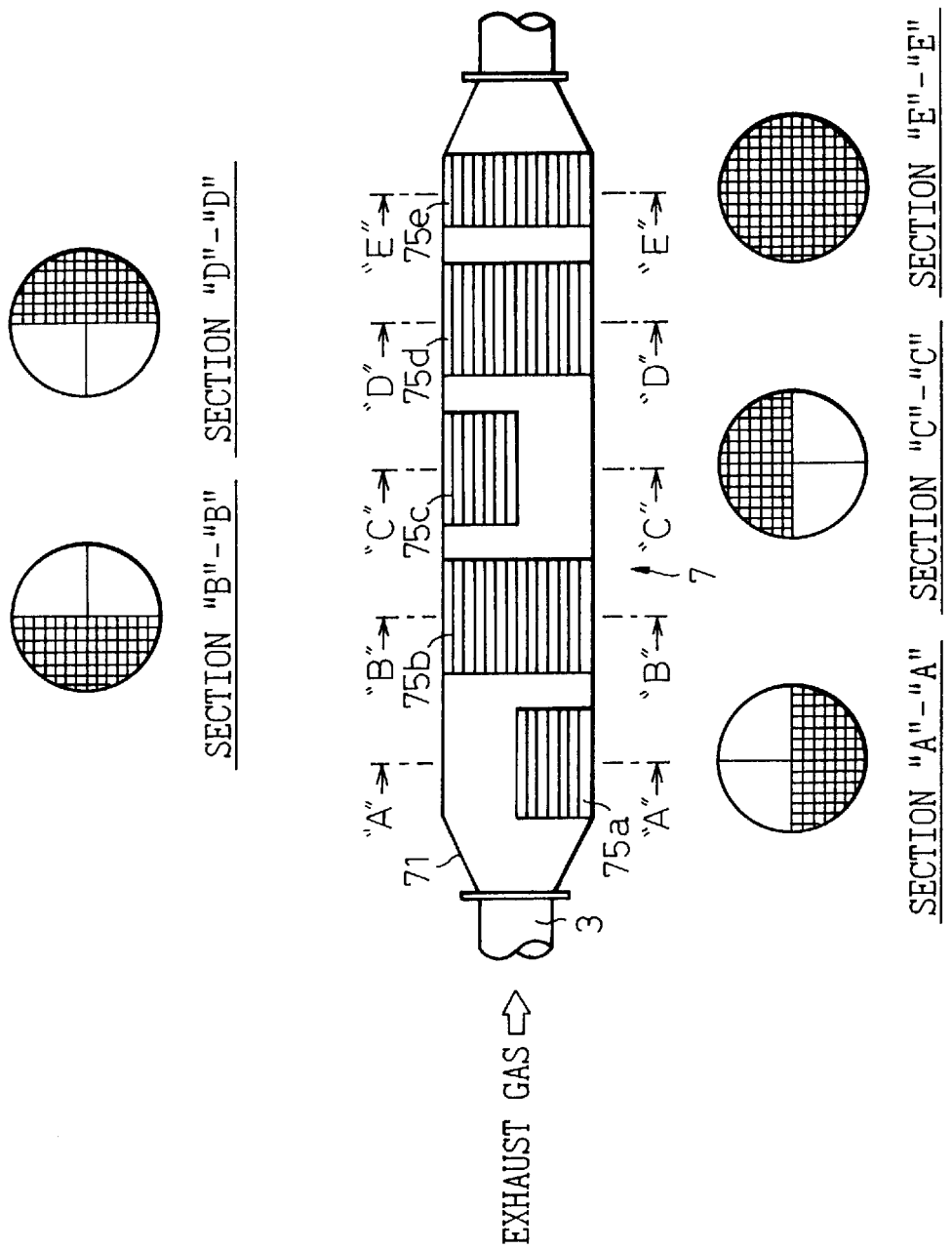
FIG. 3 is a section view illustrating another example of the construction of the catalytic converter in FIG. 1.

FIG. 3 shows another embodiment of the catalytic converter in which the bypass passages of the catalysts are formed by cutting off the substrates. In this embodiment, the number of the selective reduction catalysts contained in the casing 71 of the catalytic converter 7 is larger than the embodiment in FIG. 2, i.e., a total of five selective reduction catalysts 75a through 75e are contained in the casing 71. Further, the substrates of the upstream selective reduction catalysts 75a through 75d are cut off in half, i.e., the respective substrates have half-round shapes. The substrates of the catalysts 75a through 75d are disposed in the catalytic converter 7 in such a manner that the cross section of the substrate of each catalyst rotates by 90 degree around the longitudinal axis of the catalytic converter 7 with respect to the cross section of the substrate of the catalyst disposed immediately upstream.

In this embodiment, the cross-sectional areas of the bypass passages of the respective substrates are half of the cross-sectional area of the casing 71. Therefore, the amount of the exhaust gas passing through the bypass passages is substantially large. This causes the space velocity of the exhaust gas through the catalysts to be very low. Therefore, in this embodiment, the $NO_x$ purifying capabilities of the respective selective reduction catalysts 75a through 75d largely increase. However, in this case, the amount of the exhaust gas actually flowing through the catalysts 75a through 75d becomes small compared to the previous embodiment. Therefore, in this embodiment, the actual amount of the $NO_x$ purified by the respective catalysts becomes smaller compared to the previous embodiment even though the $NO_x$ purifying capabilities of the respective catalysts increase. Thus, a larger number of the catalysts are required in this embodiment compared to the previous embodiment. Further, the bypass passages are not formed in the most downstream selective reduction catalyst 75e also in this case in order to prevent HC and CO in the exhaust gas from passing through the catalytic converter 7 without being purified.

Next, other embodiments of the arrangement of the bypass passages 77 on the respective selective reduction catalysts will be explained with reference to FIGS. 4 and 5.

Figure 4:
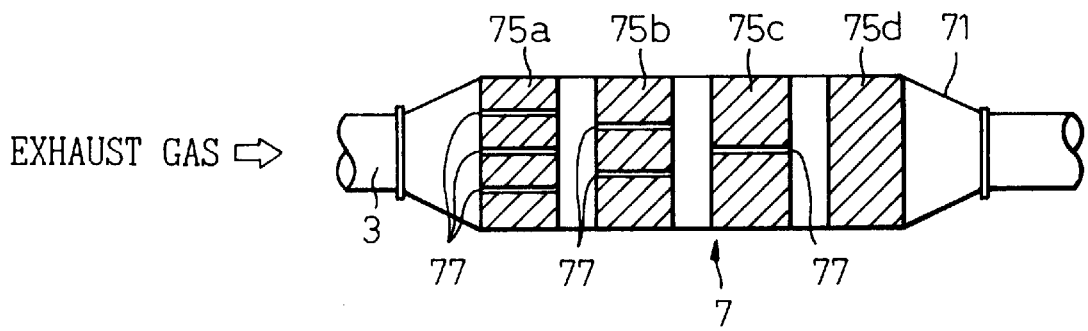
FIG. 4 is a section view illustrating another example of the construction of the catalytic converter in FIG. 1.

In FIG. 4, bypass passages 77 similar to those in FIG. 2 are disposed on the respective selective reduction catalysts 75a, 75b and 75c. However, in this embodiment, the number of the bypass passages 77 in the catalyst disposed downstream is smaller than the number of that in the catalyst disposed upstream. By this arrangement, the amount of the exhaust gas passing through the bypass passages 77 in the downstream catalyst becomes smaller than the amount of the exhaust gas passing through the bypass passages 77 in the upstream catalyst. Therefore, the amounts of HC and CO reach the most downstream catalyst 75d also becomes small. Thus, in this embodiment, HC and CO in the exhaust gas are completely purified by the most downstream catalyst 75d and no HC and CO pass through the catalytic converter 7.

Figure 5:
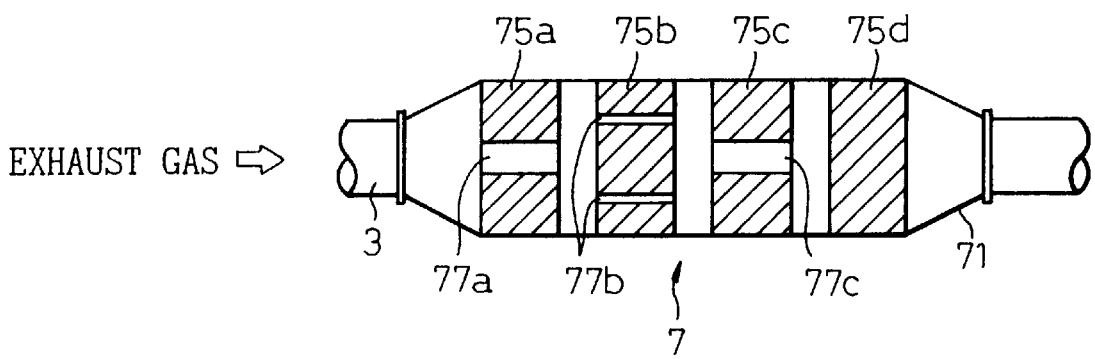
FIG. 5 is a section view illustrating another example of the construction of the catalytic converter in FIG. 1.

In the embodiment in FIG. 5, bypass passages 77a having relatively large diameters are formed in the selective reduction catalysts 75a and 75c at the center of the substrates. Further, bypass passages 77b having relatively small diameters are formed at equal intervals on the outer periphery of the substrate of the catalyst 75b disposed between the catalysts 75a and 75c. The most downstream catalyst 75d is not provided with bypass passages also in this embodiment. Since the bypass passages 75c are formed at the center of the substrates of the catalysts 75a and 75c, the concentrations of HC and CO in the exhaust gas flowing into the center part of the catalysts 75b and 75d becomes relatively large, sufficient amounts of HC and CO reach the center part of the latter half of the substrates of the catalysts 75b and 75d. Thus, the formation of sulfate in the center part of the latter half of the catalysts 75b and 75d due to shortage of HC and CO does not occur in this embodiment. Further, since the bypass passages 77b are formed on the outer periphery of the substrate of the catalyst 75b, the concentrations of HC and CO in the exhaust gas flowing into the catalyst 75d become uniform in the radial direction of the casing. Thus, the uniform distribution of HC and CO on the catalyst 75d is achieved.

Figure 6:
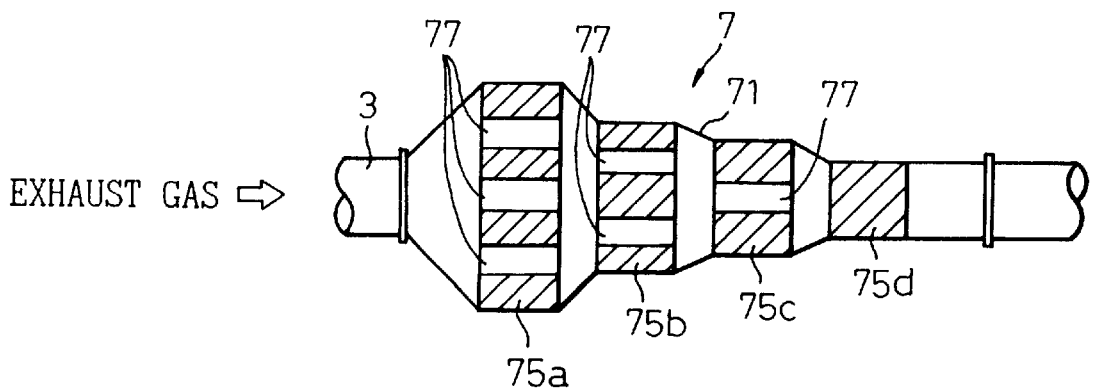
FIG. 6 is a section view illustrating another example of the construction of the catalytic converter in FIG. 1.

Next, another embodiment of the present invention will be explained with reference to FIG. 6. In FIG. 6, four selective reduction catalysts 75a through 75d are disposed in the casing 71 of the catalytic converter 7. In this embodiment also, the number of the bypass passages is larger at the upstream catalysts as in the embodiment in FIG. 4. However, in the embodiment in FIG. 6, the cross-sectional area of the substrate of the catalyst located upstream is larger than the cross-sectional area of the substrate of the catalyst located downstream. The concentrations of HC and CO in the exhaust gas flowing into the upstream catalyst are higher than those in the exhaust gas flowing into the downstream catalyst even though the bypass passages are provided. Therefore, better conditions for reducing $NO_x$ in the exhaust gas are obtained at the upstream catalysts. In this embodiment, the cross-sectional areas of the substrates of the upstream catalysts are enlarged in order to increase the area contributing to the reducing reaction of $NO_x$ and, thereby, to increase the amount of $NO_x$ reduced in suitable conditions. Further, by increasing the cross-sectional area of the substrate of the upstream catalyst, a sufficient surface area contributing to the $NO_x$ reduction is obtained even though a larger number of the bypass passages are disposed on the substrate of the upstream catalysts. Further, since the space velocity of the exhaust gas becomes lower at the upstream catalyst due to its larger cross-sectional area, the $NO_x$ purifying capability of the upstream catalyst further increases according to this embodiment.

Though the bypass passages are formed within the substrates of the catalysts in the embodiment in FIGS. 2 through 6, the bypass passages may be formed on the outside of the converter casing 71.

Figure 7:
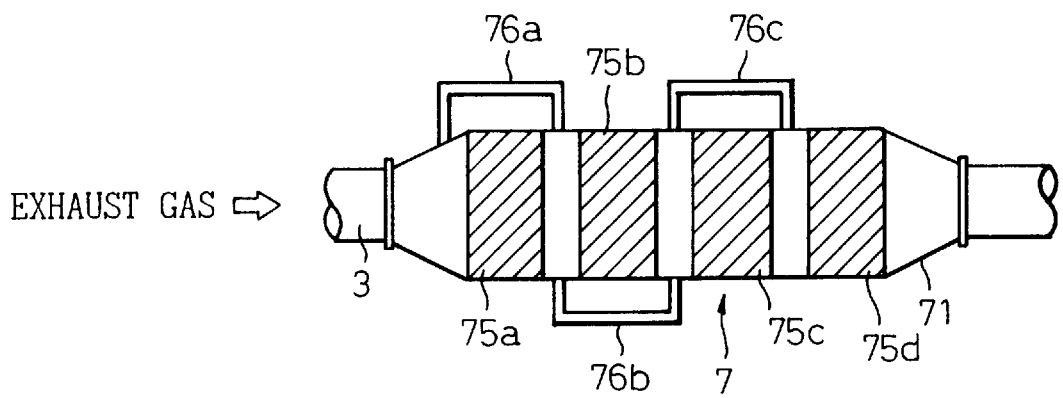
FIG. 7 is a section view illustrating another example of the construction of the catalytic converter in FIG. 1.

For example, FIG. 7 shows the case where the bypass passages 76a, 76b, 76c which bypasses the catalysts 75a, 75b and 76c, respectively are formed by the pipes disposed on the outside of the casing 71. The amounts of the exhaust gases flowing through the respective bypass passages 76a through 76c can be adjusted by changing the diameters of the respective pipes 76a through 76c.

Figure 8:
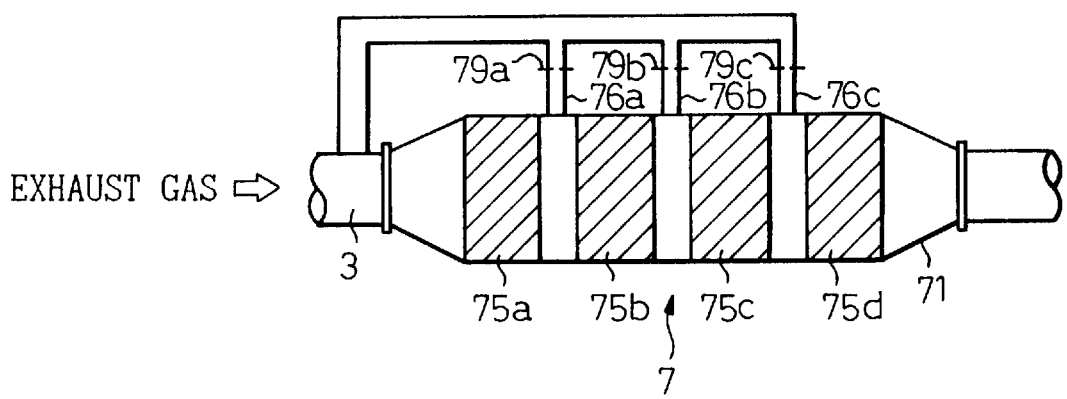
FIG. 8 is a section view illustrating another example of the construction of the catalytic converter in FIG. 1.

Further, FIG. 8 shows another type of bypass passages in which the bypass passages 76a, 76b and 76c directly connect the inlet of the catalytic converter 7 and the inlets of the catalysts 75b, 75c and 75d, respectively. The amount of the exhaust gas flowing through the passages 76a, 76b and 76c are adjusted by flow restricting orifices 79a, 79b and 79c disposed in the passages.

Next, another embodiment of the present invention will be explained with reference to FIG. 9.

Figure 9:
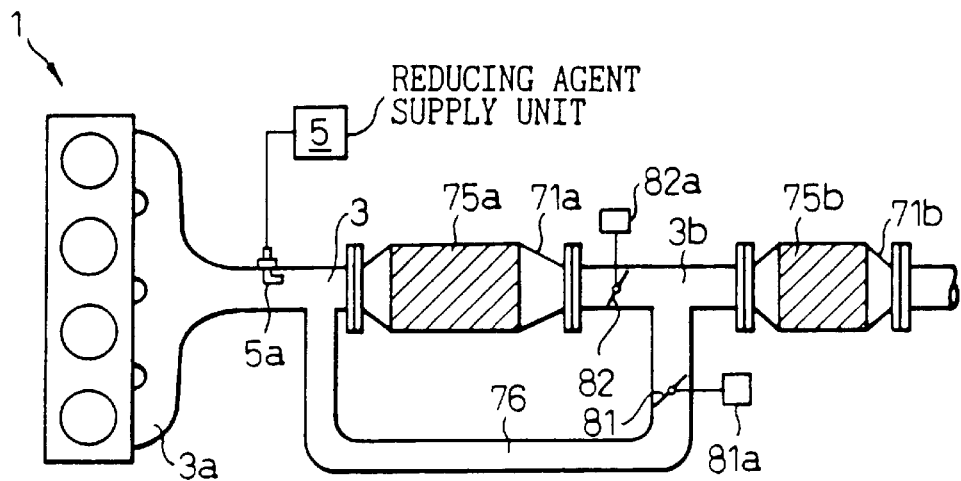
FIG. 9 is the general configuration of another embodiment of the exhaust gas purification device according to the present invention which is different from that in FIG. 1.

In FIG. 9, reference numerals same as those in FIG. 1 represents similar elements.

In the embodiment in FIG. 9, two selective reduction catalysts 75a and 75b are disposed in series in the exhaust gas passage 3 of the engine 1. The catalysts 75a and 75b are contained in independent casings 71a and 71b. The selective reduction catalysts 75a and 75b have the constructions similar to the selective reduction catalysts in the previous embodiments, except that no bypass passage is formed in the substrates thereof. However, a bypass passage 76 which bypasses the entire casing 71a of the upstream catalyst 75a is disposed. The bypass passage 76 in this embodiment connects the portion of the exhaust gas passage 3 between the reducing agent injection nozzle 5a and the inlet of the casing 71a to the inlet of the casing 71b of the catalyst 75b. Further, a flow control valve 81 is disposed in the bypass passage 76. The flow control valve 81 is provided with an appropriate type actuator 81a, such as a solenoid or a vacuum actuator for adjusting the degree of opening of the flow control valve 81. In addition, a throttle valve 82 having a similar actuator 82a is disposed in the exhaust gas passage 3b at the portion between the outlet of the casing 71a and the merging point of the bypass passage 76. By changing the degree of opening of the throttle valve 82 using the actuator 82a, the flow resistance of the exhaust gas passage 3b is adjusted.

In this embodiment, the amount of the exhaust gas passing through the bypass passage 76, i.e., the amount of the reducing agent reaches the downstream selective reduction catalyst 75b directly from the nozzle 5 is adjusted by changing the degrees of openings of the flow control valve 81 and the throttle valve 82.

For example, when the engine 1 is operated at a low load, the temperature of the upstream catalyst 75a becomes relatively low (for example, lower than 200° C.), due to a low exhaust gas temperature, and the ability of the upstream catalyst 75a as an oxidizing catalyst is relatively low. In this condition, a relatively large part of the reducing agent supplied to the upstream catalyst 75a passes through the catalyst 75a without being oxidized and a relatively large amount of the reducing agent reaches the downstream catalyst 75b even if all the exhaust gas passes through the upstream catalyst 75a. Therefore, when the engine is operated at a low load (when the exhaust gas temperature is low), the flow control valve 81 on the bypass passage 76 is fully closed and the throttle valve 82 on the exhaust gas passage 3b is fully opened. By doing so, all the exhaust gas from the engine passes through the upstream and the downstream catalysts 75a and 75b and $NO_x$ in the exhaust gas is efficiently purified. Further, since a relatively large amount of the reducing agent is contained in the exhaust gas passing the upstream catalyst 75a, the formation of sulfate on the downstream catalyst 75b does not occur.

On the other hand, when the engine load increases, the temperature of the upstream catalyst 75a becomes high (for example, 200 to 300° C.) due to a high exhaust gas temperature. In this condition, since the ability of the upstream catalyst 75a as an oxidizing catalyst increases, almost all of the reducing agent in the exhaust gas flowing into the upstream catalyst 75a is oxidized on the catalyst 75a. Therefore, in this case, the flow control valve 81 is opened while keeping the throttle valve 82 at open position in order to cause a part of the exhaust gas to directly flow into the downstream catalyst 75b. Thus, a sufficient amount of the reducing agent is supplied to the downstream catalyst 75b and, thereby, the reduction of $NO_x$ and the prevention of the formation of sulfate on the downstream catalyst 75b are assured also in this case.

When the exhaust gas temperature further rises due to a further increase in the engine load, the formation of sulfate on the upstream catalyst 75a increases due to the high temperature of the catalyst 75a. In this case, the amount of the exhaust gas flowing through the upstream catalyst 75a is decreased by increasing the amount of the exhaust gas passing through the bypass passage 76 in order to prevent the increase in the amount of sulfate formed on the upstream catalyst 75a. To do so, the throttle valve 82 is closed to an appropriate position and the degree of opening of the flow control valve 81 is increased in such a manner that substantially all of the exhaust gas passes through the bypass passage 76. In this case, substantially no exhaust gas is supplied to the upstream catalyst 75a and an increase in the formation of the sulfate on the upstream catalyst 75a does not occur. Further, since a sufficient amount of the reducing agent is supplied to the downstream catalyst 75b, all the $NO_x$ in the exhaust gas is reduced on the downstream catalyst 75b. Also, the temperature of the downstream catalyst 75b is relatively low compared to the upstream catalyst 75a, and a sufficient amount of the reducing agent exists on the downstream catalyst 75b. Therefore, the formation of sulfate on the downstream catalyst 75b is also suppressed in this case.

As explained before, sulfates are adsorbed in the substrates of the catalysts 75a and 75b during the engine operation. The adsorbed sulfates are released into the exhaust gas when the temperature of the catalyst becomes high or the oxygen concentration in the exhaust gas becomes low. Therefore, when the exhaust gas temperature increases in a short time such as during an acceleration or a sudden increase in the engine load, sulfate is discharged from the upstream catalyst 75a and flows into the downstream catalyst 75b. In this case, it is necessary to increase the amount of reducing agent supplied to the downstream catalyst 75b in order to reduce a large amount of sulfate on the downstream catalyst 75b. Therefore, when the engine is accelerated, or the engine load is suddenly increased, the amount of the exhaust gas passing through the bypass passage 76 is increased rapidly by throttling the throttle valve 82 and increasing the degree of opening of the flow control valve 81 in a short time. By increasing the amount of the reducing agent supplied to the downstream catalyst 75b in a short time, all of the sulfate discharged from the upstream catalyst 75a is reduced on the downstream catalyst 75b and sulfate does not diffuse into the atmosphere.

Though both the flow control valve 81 and the throttle valve 82 are used to control the amount of the exhaust gas passing through the bypass passage 76 in this embodiment, the amount of the exhaust gas passing through the bypass passage 76 may be controlled by either of the flow control valve 81 and the throttle valve 82.

Next, another embodiment will be explained.

In this embodiment, the construction of the catalytic converters and the selective reduction catalysts are the same as those in the embodiments in FIGS. 1 through 8. However, in this embodiment, the catalytic components carried by the most downstream selective reduction catalyst (75d in FIGS. 2 through 8) are different from those carried by the upstream selective reduction catalysts (75a, 75b and 75c in FIGS. 2 through 8). As explained before, the catalytic components carried on the substrates of the selective reduction catalyst are, in general, precious metals such as platinum Pt, silver Ag, palladium Pd, rhodium Rh, iridium Ir, or base metals such as copper Cu, iron Fe, cobalt Co, nickel Ni. It is known that the catalytic components of base metals such as Cu, Fe, Co, Ni and precious metal Ag have oxidizing abilities lower than that of the catalytic components of other precious metals such as Pt. Therefore, when these catalytic components having lower oxidizing abilities are used, the selective reduction catalyst forms substantially no sulfates while oxidizing HC and CO in the exhaust gas.

In this embodiment, the metal catalytic components having large oxidizing abilities such as Pt are used for the upstream selective reduction catalysts 75a, 75b and 75c while the metal catalytic components having a low oxidizing abilities, for example, base metals such as Fe, or precious metal such as Ag are used for the most downstream selective reduction catalyst 75d.

When the exhaust gas temperature is not high (for example, when the exhaust gas temperature is 200 to 300° C.), a part of the reducing agent supplied from the reducing agent injection nozzle 5a passes through the bypass passages of the upstream selective reduction catalyst 75a, 75b and 75c and reaches to the most downstream selective reduction catalyst 75d. Since the temperature of the most downstream catalyst 75d is relatively low in this condition, the oxidizing ability of the most downstream catalyst is low, and a large part of the reducing agent flowing into the most downstream catalyst 75d is adsorbed in the catalyst 75d without being oxidized. Further, when the exhaust gas temperature becomes high due to an acceleration or an increase in the engine load, the sulfates adsorbed in the upstream catalysts 75a, 75b and 75c are released into the exhaust gas and a large amount of sulfates flows into the most downstream catalyst 75d. However, since a relatively large amount of HC, CO are adsorbed and held in the most downstream catalyst 75d, all the sulfates flowing into the most downstream catalyst 75d are reduced on the most downstream catalyst 75d by the HC and CO adsorbed therein. Further, since the oxidizing ability of the most downstream catalyst 75d is relatively low, $SO_2$ formed by the reduction of the sulfates are not oxidized on the most downstream catalyst 75d and substantially no sulfates are contained in the exhaust gas downstream of the most downstream catalyst 75d. Thus, sulfates are not diffused into the atmosphere even though the operating condition of the engine has changed.

Next, another embodiment of the present invention, which is different from the previous embodiments, will be explained with reference to FIG. 10.

Figure 10:
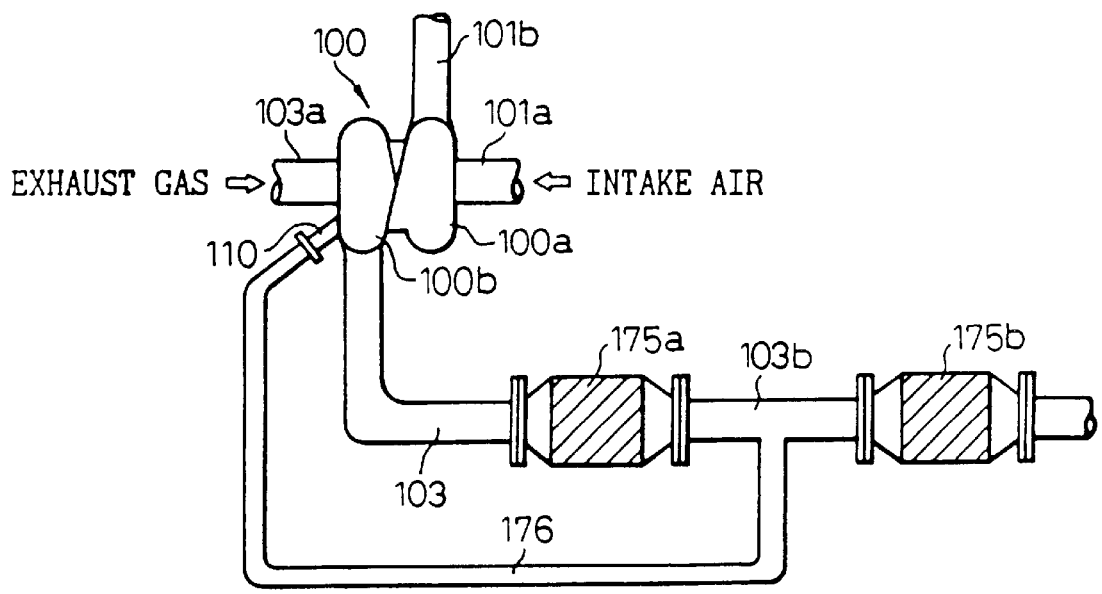
FIG. 10 is the general configuration of another embodiment of the exhaust gas purification device according to the present invention which is different from that in FIGS. 1 and 9.

The embodiment in FIG. 10 is different from those in the previous embodiment in that a gasoline engine which can be operated at a lean operating air-fuel ratio, i.e., a lean-burn engine is used (not shown in the drawing). Further, a turbocharger 100 is provided in the exhaust gas passage of the engine. A pair of $NO_x$ occluding and reducing catalyst 175a and 175b are disposed in series in the exhaust gas passage 103 connected to the exhaust gas outlet of the turbocharger 100.

The $NO_x$ occluding and reducing catalyst in this embodiment uses, for example, alumina as a substrate and, precious metals such as platinum (Pt) rhodium (Rh), and at least one substance selected from alkali metals such as potassium (K), sodium (Na), lithium (Li) and cesium (Cs); alkali-earth metals such as barium (Ba) and calcium (Ca); and rare-earth metals such as lanthanum (La) and yttrium (Y), are attached to the substrate. The $NO_x$ occluding and reducing catalyst absorbs and holds $NO_x$ in the exhaust gas in the form of nitric acid ions $NO_3^-$ when the air-fuel ratio of the exhaust gas is lean, and releases the absorbed $NO_x$ and reduces the same by HC and CO in the exhaust gas when the air-fuel ratio of the exhaust gas becomes rich.

Since the engine in this embodiment is normally operated at a lean air-fuel ratio, the $NO_x$ occluding and reducing catalysts 175a and 175b absorb $NO_x$ in the exhaust gas. Further, the operating air-fuel ratio of the engine 1 is periodically switched to a rich air-fuel ratio for a short time so that the absorbed $NO_x$ in the $NO_x$ occluding and reducing catalysts are released and reduced. Namely, the engine itself acts as a reducing agent supply means in this embodiment.

In this embodiment, the outlet of the waste gate valve (waste gate port) 110 of the turbocharger 100 is connected to the exhaust gas passage 103b at the portion between the $NO_x$ occluding and reducing catalysts 175a and 175b by a waste gate passage 176. In FIG. 10, 101a designates a air inlet passage to the compressor 100a of the turbocharger 100 and 101b designates an intake air passage connecting the engine intake manifold (not shown) to the outlet of the compressor 100a. 103a in FIG. 10 is a exhaust gas inlet of the turbocharger 100 for directing the exhaust gas of the engine to the turbine 100b of the turbocharger 100 and 103 is an exhaust gas passage connected to the outlet of the turbine 100b. The waste gate valve of the turbocharger 100 is actuated in accordance with the discharge pressure of the compressor 100a of the turbocharger 100. Namely, when the amount of the exhaust gas of the engine is low, the waste gate valve is fully closed, and all of the exhaust gas from the engine flows into the turbine 100b of the turbocharger 100. When the engine load increases and the amount of the exhaust gas from the engine becomes larger, the waste gate valve opens to direct a part of the exhaust gas from the engine to the waste gate passage 176 in order to lower the turbine speed. Thus, the discharge pressure of the compressor 100a is maintained at the value lower than a predetermined value.

As explained before, the releasing and reducing operation of the $NO_x$ absorbed in the $NO_x$ occluding and reducing catalyst is performed by supplying HC and CO to the $NO_x$ occluding and reducing catalyst by operating the engine at a rich air-fuel ratio periodically. However, when the $NO_x$ occluding and reducing catalysts 175a and 175b are arranged in the exhaust gas passage in series, a large part of HC and CO in the exhaust gas is used by the upstream $NO_x$ occluding and reducing catalyst 175a and the amount of HC and CO reach the downstream $NO_x$ occluding and reducing catalyst 175b becomes very small. Further, when the temperature of the $NO_x$ occluding and reducing catalyst becomes excessively high, $NO_x$ absorbed in the catalyst is released without being reduced, i.e., the $NO_x$ purifying ability of the $NO_x$ occluding and reducing catalyst becomes lower when the temperature of the catalyst is excessively high.

However, when the engine load increases and the exhaust gas temperature becomes high, the waste gate valve opens. Since the outlet of the waste gate valve is connected to the downstream $NO_x$ occluding and reducing catalyst 175b by the waste gate passage 176 in this embodiment, a part of the exhaust gas upstream of the turbocharger 100 containing HC and CO is directly supplied to the downstream $NO_x$ occluding and reducing catalyst 175b without passing through the upstream $NO_x$ occluding and reducing catalyst 175a when the waste gate valve opens. Therefore, a large amount of the reducing agent is supplied to the downstream $NO_x$ occluding and reducing catalyst 175b when the waste gate valve opens, i.e., when the engine load increases and the exhaust gas temperature becomes high. Thus, even if the absorbed $NO_x$ in the upstream $NO_x$ occluding and reducing catalyst 175a is discharged without being reduced due to increase in the exhaust gas temperature, all the $NO_x$ in the exhaust gas can be purified by the downstream $NO_x$ occluding and reducing catalyst 175b. Further, since the temperature of the downstream $NO_x$ occluding and reducing catalyst 175b is relatively low compared to the upstream $NO_x$ occluding and reducing catalyst 175a, even when the exhaust gas temperature is high, a high $NO_x$ purifying ability of the downstream $NO_x$ occluding and reducing catalyst 175b is maintained even when the $NO_x$ purifying ability of the upstream $NO_x$ occluding and reducing catalyst 175a deteriorates.

According to this embodiment, the change in the $NO_x$ purifying ability of the $NO_x$ occluding and reducing catalyst due to the change in the exhaust gas temperature can be automatically compensated for by the operation of the waste gate valve and a high $NO_x$ purifying ability is maintained regardless of a change in the engine operating condition.

What is claimed is:

1. An exhaust gas purification device for an internal combustion engine operated at a lean operating air-fuel ratio comprising:

a plurality of selective reduction catalysts disposed in series in the exhaust gas passage of the engine, wherein each of the selective reduction catalysts is capable of reducing $NO_x$ in the exhaust gas of the engine by selectively reacting $NO_x$ with a reducing agent in the exhaust gas even if the air-fuel ratio of the exhaust gas is lean;

reducing agent supply means for supplying the reducing agent to the exhaust gas in the exhaust gas passage upstream of a first selective reduction catalyst disposed on the most upstream side in the selective reduction catalysts so that the exhaust gas containing the reducing agent is always supplied to the first selective reduction catalyst during operation of the engine; and bypass passage means for bypassing at least the first catalyst in such a manner that, during operation of the engine, a part of the exhaust gas containing the reducing agent always directly flows into selective reduction catalysts downstream of the first catalyst without flowing through the first catalyst.

2. An exhaust gas purification device as set forth in claim 1, wherein the bypass passage means comprises a through passage formed within the substrate of the first catalyst.

3. An exhaust gas purification device as set forth in claim 2, wherein the through passage is formed by cells or capillaries of the substrates of the first catalyst which have cell walls or capillary walls carrying no catalytic components.

4. An exhaust gas purification device as set forth in claim 2, wherein the through passage is formed by cutting off a part of the substrate from the upstream end to the downstream end thereof.

5. An exhaust gas purification device as set forth in claim 2, wherein the through passage directs the exhaust gas bypassing the first catalyst to the center part of the upstream end face of the selective reduction catalyst downstream of the first catalyst.

6. An exhaust gas purification device as set forth in claim 5, wherein the through passage is formed by series of cells or capillaries of the substrates of the first catalyst which have cell walls or capillary walls carrying no catalytic components.

7. An exhaust gas purification device as set forth in claim 5, wherein the through passage is formed by cutting off a part of the substrate from the upstream end to the downstream end thereof.

8. An exhaust gas purification device as set forth in claim 1, wherein a cross-sectional areas perpendicular to the exhaust gas flow direction of the substrates of the selective reduction catalysts are selected in such a manner that the cross-sectional area of the substrate of each selective reduction catalyst is larger than the cross-sectional area of the substrate of the selective reduction catalyst disposed downstream of said each selective reduction catalyst.

9. An exhaust gas purification device as set forth in claim 1, wherein the catalytic components used for, at least, the most downstream selective reduction catalyst have lower capabilities for converting sulfur in the exhaust gas into sulfate than the capabilities of the catalytic components used for other selective reduction catalysts.

10. An exhaust gas purification device as set forth in claim 9, wherein the catalytic components used for the most downstream selective reduction catalyst are base metal catalytic components.

11. An exhaust gas purification device as set forth in claim 1, further comprising a first flow control means for controlling the flow rate of the exhaust gas through the bypass passage message in accordance with the operating condition of the eternal combustion engine.

12. An exhaust purification device as set forth in claim 11, further comprising a second flow control means for controlling the flow rate of the exhaust gas through at least the first catalyst.

13. An exhaust purification device as set forth in claim 12, wherein the catalytic components used for, at least, the most downstream selective reduction catalyst have lower capabilities for converting sulfur in the exhaust gas into sulfate than the capabilities of the catalytic components used for other selective reduction catalysts.

14. An exhaust gas purification device as set forth in claim 13, wherein the catalytic components used for the most downstream selective reduction catalyst are base metal catalytic components.

15. An exhaust purification device as set forth in claim 12, wherein the first flow of control means is disposed within the bypass passage means.

16. An exhaust purification device as set forth in claim 12, wherein the second flow of control means is disposed between an outlet of the first catalyst and a merging point of the exhaust gas passage and the bypass passage means.

17. An exhaust purification device as set forth in claim 16, wherein the first flow of control means is disposed within the bypass passage means.

* * * * *